United States Patent [19]

Park

[11] Patent Number: 5,193,009
[45] Date of Patent: Mar. 9, 1993

[54] SIGNAL SWITCHING METHOD OF A TV-VCR COMBINATION HAVING TWO TUNERS

[75] Inventor: Keun Park, Seoul, Rep. of Korea
[73] Assignee: Goldstar Co., Ltd., Seoul, Rep. of Korea
[21] Appl. No.: 467,374
[22] Filed: Jan. 19, 1990
[30] Foreign Application Priority Data
Jan. 20, 1989 [KR] Rep. of Korea .................. 661/1989
[51] Int. Cl.$^5$ ............................................ H04N 5/782
[52] U.S. Cl. .................................... 358/335; 360/33.1
[58] Field of Search ...................... 360/33.1; 358/335
[56] References Cited
U.S. PATENT DOCUMENTS

| | | | |
|---|---|---|---|
| 3,829,891 | 8/1974 | Uchida | 360/33.1 |
| 4,031,548 | 6/1977 | Kato et al. | 358/335 |
| 4,167,704 | 9/1979 | Sato et al. | 360/33.1 |
| 4,267,563 | 5/1981 | Sato et al. | 358/335 |
| 4,272,784 | 6/1981 | Saito et al. | 358/335 |
| 4,602,297 | 7/1986 | Reese | 360/13 |
| 4,916,532 | 4/1990 | Streck et al. | 358/335 |
| 5,047,867 | 9/1991 | Strubbe et al. | 358/335 |

Primary Examiner—Donald McElheny, Jr.

[57] ABSTRACT

A signal switching method of a TV-VCR combination having two tuners is disclosed which enables two channel simultaneous receiving for recording one channel and displaying another channel, or the same channel, and which is capable at the same time of switching the screen of monitor separately and independently providing increased convenience to users. The method includes the steps of scanning the state of key input using a microcomputer and displaying the key information on a digitron or display, thereby controlling respectively the TV tuner, VCR tuner and shifting switches. In response to the respective control signals for the tuners, a recording/playback signal, a VCR tuner/line input signal, a VCR-line/playback signal and a TV/VCR signal is generated by the microcomputer. The respective shifting switches are selectively connected for executing various functions including two channel simultaneous receiving for recording and displaying channels separately concurrently or independently. Two program simultaneous recording is enabled, and at the same time, monitoring of the TV or the VCR and line input can be selectively and voluntarily executed.

7 Claims, 4 Drawing Sheets

SIGNAL SWITCHING METHOD OF A TV-VCR COMBINATION HAVING TWO TUNERS

BACKGROUND OF THE INVENTION

1. Field of the Invention

The present invention relates to a signal switching system of a TV-VCR combination and more particularly, to a signal switching method of a TV-VCR combination having two tuners which can perform two-program recording by a simple operation of the key and at the same time, is capable of switching the screen of monitor separately and independently, thereby improving user convenience a.

2. Description of the Background Art

Various types of conventional TV-VCR combinations having a tuner are well known in the art. Such conventional TV-VCR combinations have only one tuner provided for the VCR so that two kinds of recording signals a tuner input and line input are selected and recorded by a tuner/line selecting control signal a while a playback signal is selected by a record/playback control signal.

However, since only one tuner is provided in such a conventional TV combined VCR, there are a number of disadvantages such as, for example, a two channel simultaneous receiving function for receiving one channel and displaying another channel or the same channel cannot be executed or recording of a channel from the VCR tuner cannot be performed while displaying another TV channel signal on a monitor.

SUMMARY OF THE INVENTION

Accordingly, it is an object of the present invention to provide an improved switching device for executing a switching function of a TV tuner, VCR tuner, and line input signal by comprising two tuners in a TV-VCR combination so that a two-program recording and reproducing function with a monitor can be executed, thereby providing more various and convenient functions to the user.

Another object of the present invention is to provide a signal switching system of a TV-VCR combination which comprises:

(a) scanning the state of a key input unit by a microcomputer to display on a digitron or a function display, the state of the key input unit and simultaneously controlling a TV tuner and a VCR tuner by respective tuner control signals;

(b) controlling a shifting switch connected to a video head through a rotary transformer to selectively connect the video head to the record processing unit or playback processing unit under direction of a playback-/recording control signal of the microcomputer;

(c) controlling the shifting switch by the tuner/line control signal of the microcomputer to select one signal as the output signals from either the VCR tuner and line input and then applying the selected signal to the record processing unit;

(d) controlling the shifting switch by a record-playback/playback control signal of the microcomputer to select one signal from either the signal to be applied to the record processing unit or the output signal of the playback processing unit for VCR signal; and (e) controlling the shifting switch by a TV/VCR control signal of the microcomputer to select one signal from either the output signal of the TV tuner or the VCR signal and then applying the selected signal to the monitor.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a signal switching method of a TV-VCR combination having two tuners which enables two channels simultaneous receiving for recording one channel and displaying another channel or the same channel and at the same time, which is capable of switching the screen of monitor separately and independently, thereby improving user convenience a the method includes scanning the state of key input by a microcomputer and the state on a, or function display thereby controlling respectively a TV tuner, VCR tuner and shifting switches, in response to the respective control signals for a tuner, a recording/playback, a VCR tuner/line input, a VCR-line/-playback, a TV/VCR generated by and microcomputer so that connected respective shifting switches can be selectively connected for executing various functions including two channel simultaneous receiving for recording and displaying channels separately a concurrently or independently, accordingly two program simultaneous recording is enabled, and at the same time, monitoring of the TV or the VCR and line input can be selectively and voluntarily executed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
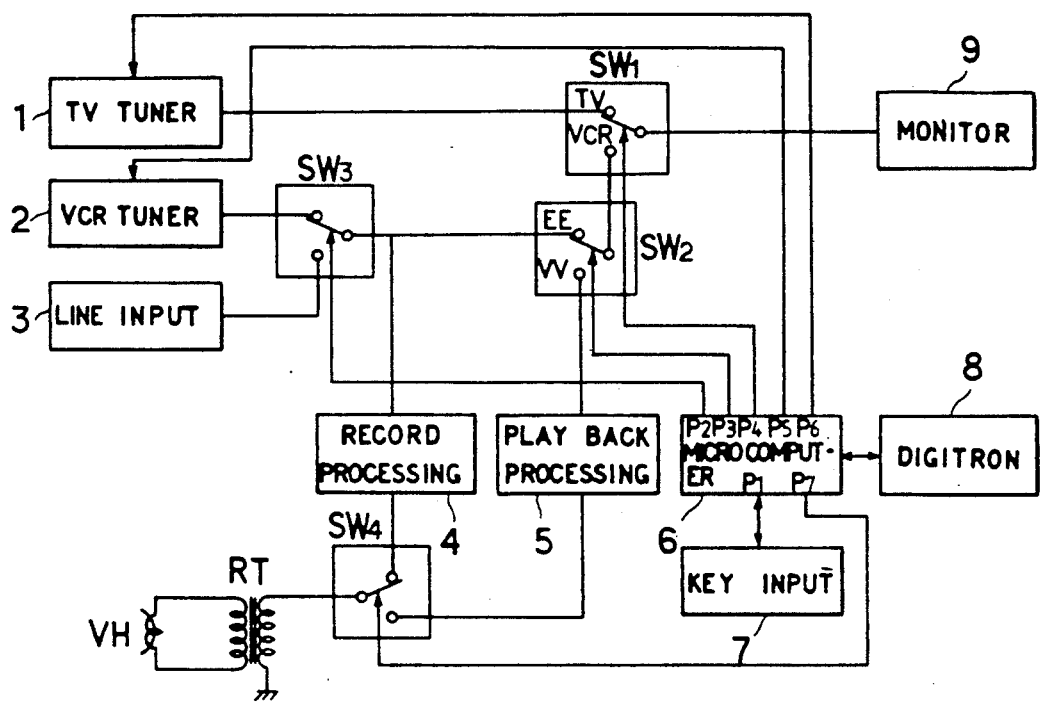
FIG. 1 is a block diagram illustrating the circuit structure embodying a signal switching method of the TV-VCR combination of the present invention.

Referring now in detail to the drawings for the purpose of illustrating preferred embodiments of the present invention, the signal switching method of the TV combined VCR a as shown in FIG. 1 a comprises steps wherein a state of a key input unit 7 is scanned and displayed on a digitron or display 8 by a microcomputer 6 and a TV tuner 1 and a VCR tuner 2 is controlled by respective tuner control signals a record/playback shifting switch SW4 is controlled by a playback/recording control signal of the microcomputer 6 to connect a rotary transformer RT associated with a video head VH selectively to a playback processing unit 5 or a recording processing unit 4 a VCR tuner/line input shifting switch SW3 is controlled by a tuner/line control signal of the microcomputer 6 to select and apply one of the output signals of the VCR tuner 2 and a line input 3 to the recording processing unit 4 a VCR-line/playback shifting switch SW22 controlled by the VCR-line/playback control signal of the microcomputer 6 to select one of the output signals of the VCR tuner/line input shifting switch SW3 and a playback processing unit 5 a TV/VCR shifting switch SW1 is controlled by the TV/VCR control signal of the microcomputer 6 and one of the output signals of the TV tuner 1 and VCR-line/playback shifting switch SW2 is applied as the selected signal to a monitor 9.

Figure 2:
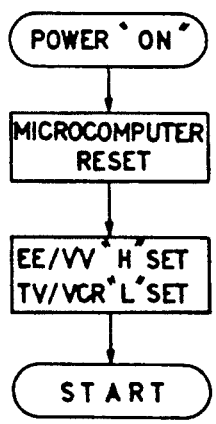
FIG. 2 is a flow chart for initial state processing in the signal switching method of the TV-VCR combination of the present invention.

According to the present invention, the signal switching system of a TV-VCR combination operates as follows:

As shown in FIG. 2, when the electric power is supplied in an initial state from a power supply source, the microcomputer 6 is reset and outputs a high potential VCR-line/playback control signal through its terminal P3 and short circuits the VCR-line/playback shifting switch SW2 to its VCR-line terminal EE and outputs a high potential TV control signal through its terminal P4 to short-circuit the TV/VCR shifting switch SW1 to a TV terminal TV. That is, at this time, the output signal of the TV tuner 1 is selected at the TV/VCR shifting switch SW1 and is applied to the monitor 9 and the output signal of the VCR tuner 2 or the output signal of the line input 3 selected at the VCR tuner/line input shifting switch SW3 is selected at the VCR-line/playback shifting switch SW2.

Figure 3:
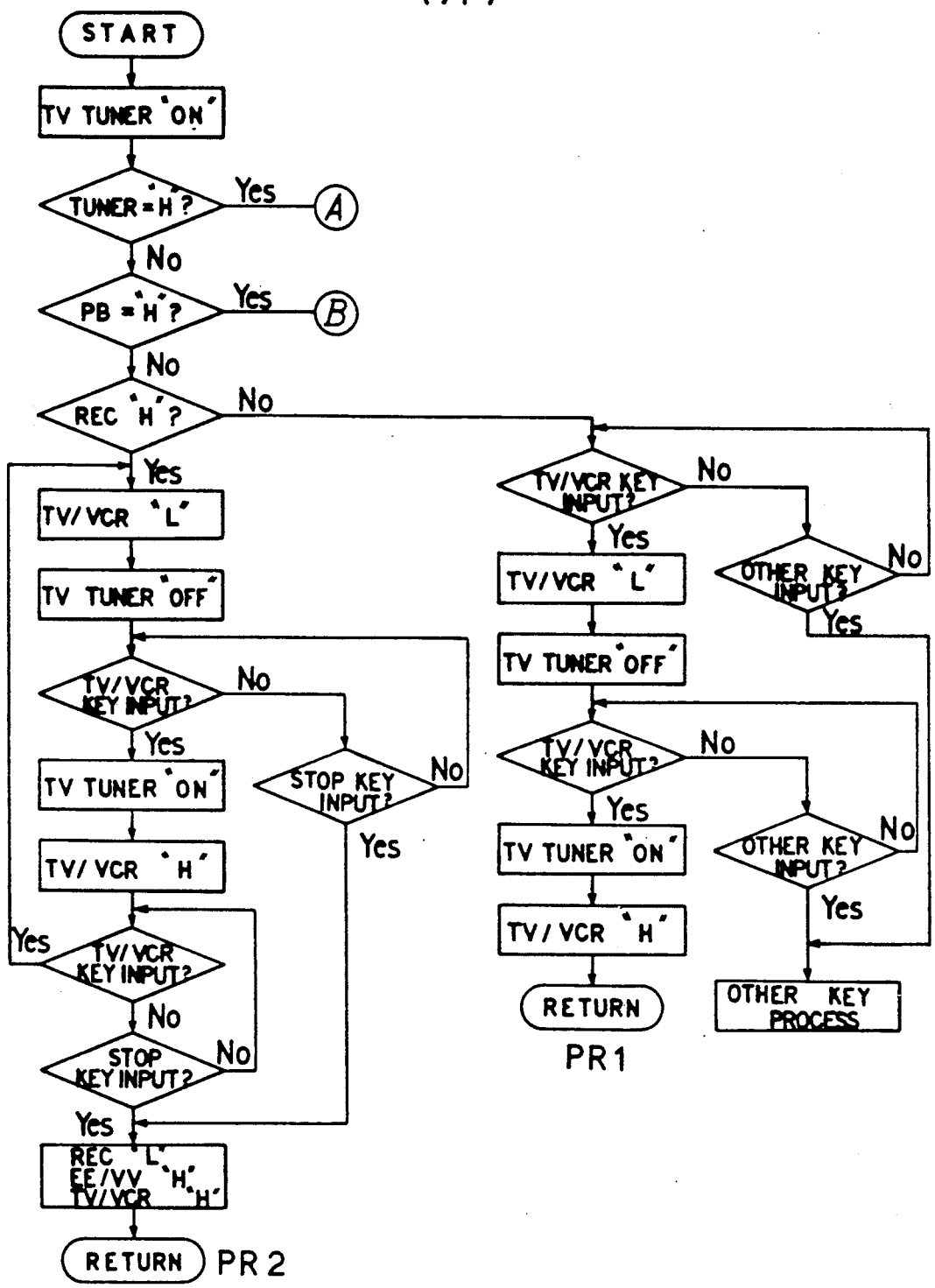
FIG. 3(A) is a flow chart for the signal switching of the recording/playback mode and record mode in the line input selection mode of the VCR according to the signal switching method of the TV-VCR combination of the present invention.
FIG. 3(B) is a flow chart for the signal switching of the recording mode in the VCR tuner selection mode and the signal switching of the playback mode in the line input/tuner selection mode of the VCR according to the present invention.
FIG. 3(C) is a flow chart for the signal switching of the recording/playback mode in the tuner selection mode of VCR according to the present invention.
Figure 3:
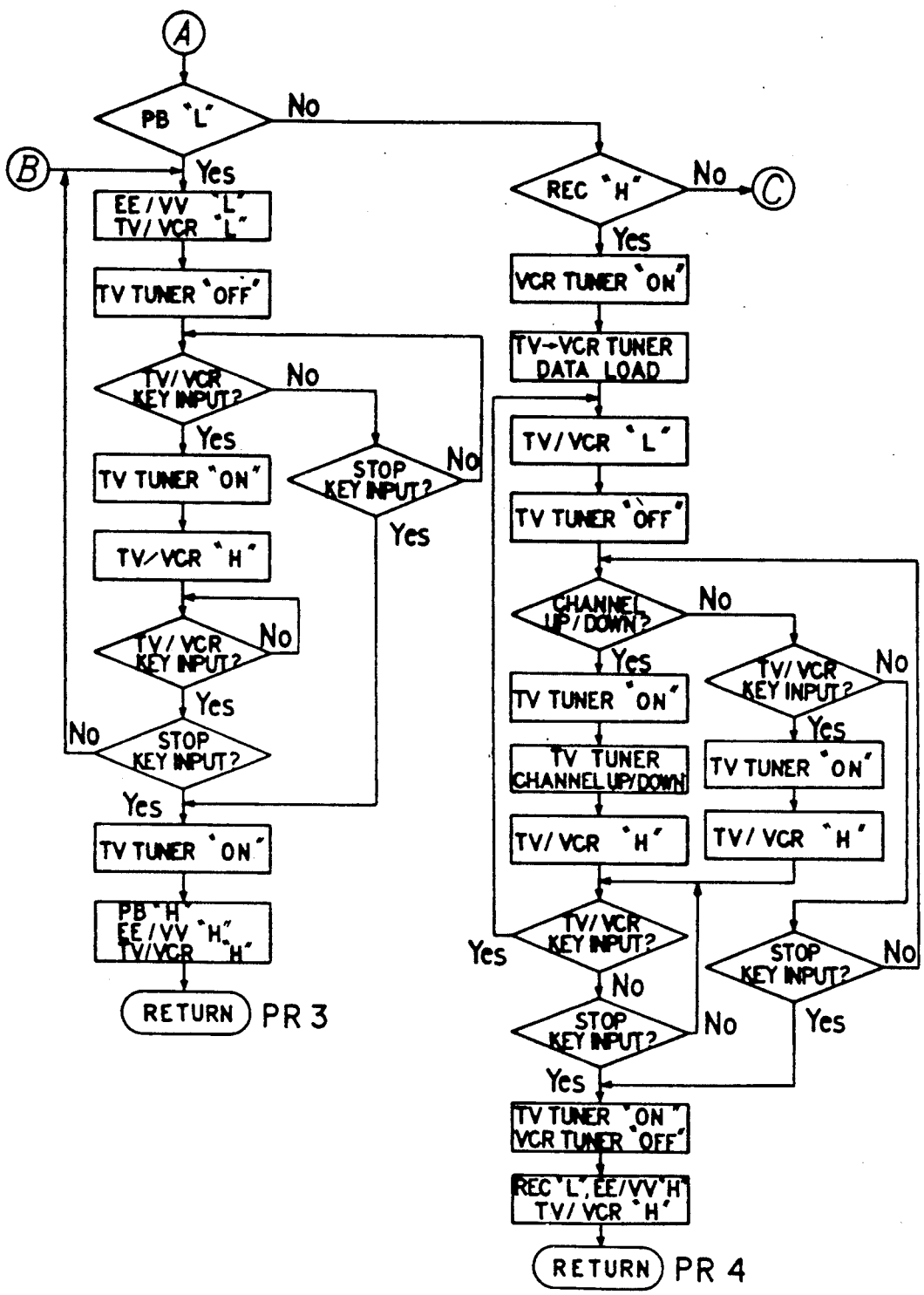
Figure 3:
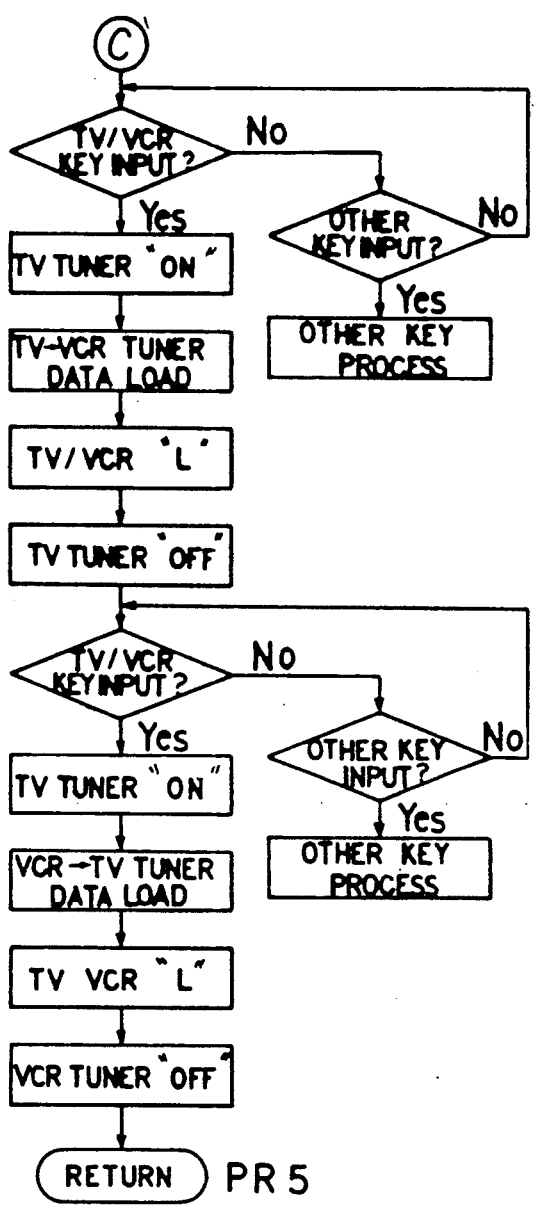

Thereafter, as shown in FIG. 3(A), turning on the TV tuner 1 and then outputting a low potential VCR tuner/line control signal through a terminal P2 of the microcomputer 6 and rendering to select the signal of the line input 3 at the VCR tuner/line input shifting switch SW3, and the signal of the line input 3 thus selected is applied to the record processing unit 4 and simultaneously, applied to the VCR-line terminal EE of VCR-line/playback shifting switch SW2.

When the TV/VCR key is pressed and its key signal is input to the microcomputer 6 from the key input unit 7 in this state, a low potential TV/VCR signal is output through the terminal P4 to short-circuit the TV/VCR shifting switch SW1 to its VCR terminal VCR, and a low potential signal is output through the terminal P6 of the microcomputer 6 to turn off the TV tuner 1. Therefore, the output signal of the line input 3 is applied to the monitor 9 through the shifting switches SW3, SW2, and SW1.

When the TV/VCR key signal is input again from the key input unit 7 to the microcomputer 6 in this state, a high potential is output to the terminal P6 of the microcomputer 6 to turn on the TV tuner 1, and a high potential TV control signal is output through the terminal P4 of the microcomputer 6 to short-circuit the TV/VCR shifting switch SW1 to its TV terminal TV. Therefore, the output signal of the TV tuner 1 is applied to the monitor 9 through the TV/VCR shifting switch SW1.

When the TV/VCR key signal is not input and another key signal is input, the other key condition is processed.

On the other hand, when a low potential tuner control signal is output through the terminal P2 of the microcomputer 6 a as in the above description a the output signal of the line input 3 is selected at the VCR tuner/line input shifting switch SW3. The recording mode signal is input from the key input unit 7 to the microcomputer 6 and becomes a state that a high potential recording control signal is output to the terminal P7 of the microcomputer 6. That is, routine PR2 is selected for the line input 3 and recording mode. Therefore, the output signal of the line 3 is applied to the monitor 3 through the shifting switches SW3, SW2, and SW1. Furthermore, at this time, the recording/playback shifting switch SW4 is short-circuited to the record processing unit 4 by the high potential record control signal being output through the terminal P7 of the microcomputer 6. Therefore, the output signal of the line input 3 is applied and processed to the record processing unit 4 through the VCR tuner/line input shifting switch SW3 and then is applied to the video head VH through the recording/playback shifting switch SW4 and rotary transformer RT and then is recorded.

When the TV/VCR key signal is input to the microcomputer 6 in this state, a high potential TV control signal is output to the terminal P4 of the microcomputer 6. Therefore, the output signal of the TV tuner 1 is applied to the monitor 9 through the TV/VCR shifting switch SW1 as in the above description. In this state, the output signal of the line input 3 is applied to the video head VH through the shifting switch SW3, the record processing unit 4, the recording/playback shifting switch SW4, and the rotary transformer RT, and then is recorded.

When the TV/VCR key signal is input again to the microcomputer 6, a low potential VCR control signal is output through the terminals P4 of the microcomputer 6 and the TV/VCR shifting switch SW1 is short-circuited to its VCR terminal VCR. Therefore, as in the above description, the output signal of the line input 3 is applied to the monitor 9 and simultaneously, a low potential signal is output through the terminal P6 of the microcomputer 6 and the TV tuner 1 is turned off. When a stop key signal is input from the key input unit 7 to the microcomputer 6, a low potential playback control signal is output through the terminal P7 of the microcomputer 6 to stop the recording mode and then is returned to the initial state that the aforementioned power supply source is supplied.

As shown in FIG. 3(B), when the playback key signal is input to the microcomputer 6 and routine PR3 is entered wherein the low potential playback signal is output to its terminal P7, the recording/playback shifting switch SW4 is short-circuited to the playback processing unit 5 by the low potential playback control signal, and at this time, the low potential playback control signal is output through the terminal P3 of the microcomputer 6 to short-circuit the VCR-line/playback shifting switch SW2 to its playback terminal VV. The low potential VCR control signal is output through the terminal P4 of the microcomputer 6 to short-circuit the TV/VCR shifting switch SW1 to its VCR terminal VCR. Therefore, at this time, the signal played back from the video head VH is applied to the playback processing unit 5 through the rotary transformer RT and the recording/playback shifting switch SW4 and is processed and then applied to the monitor 9 through the shifting switches SW1 and SW2.

At this state, when the TV/VCR key input signal is input to the microcomputer 6 as in the above description, the TV tuner 1 is turned on by the control of the microcomputer 6 and the TV/VCR shifting switch SW1 is short-circuited to its TV terminal TV and the output signal of the TV tuner 1 is applied to the monitor 9 through its shifting switch SW1.

When the TV/VCR key signal is input again to the microcomputer 6 in this state, the low potential playback signal is output through the terminal P3 of the microcomputer 6, and the low potential VCR control signal is output to the terminal P4. Therefore a as in the aforementioned description, the playback signal of video head VH is applied to the monitor 9.

When the stop key signal is input to the microcomputer 6 in this playback mode, the playback mode is stopped and then is returned to the initial state of the power source that is supplied.

The high potential tuner control signal is output through the P2 terminal of the microcomputer 6 and the VCR tuner/line shifting switch SW3 is short-circuited to the VCR tuner 2, and the high potential record control signal is output through the P7 terminal of the microcomputer 6 and the recording/playback shifting switch SW4 is short-circuited to the record processing unit 4. That is, routine PR4 is entered which selects the VCR tuner 2 and the record mode. The VCR tuner 2 is turned on upon the control of the microcomputer 6, and at this time, the low potential VCR control signal is output through the terminal P4 of the microcomputer 6 and the TV/VCR shifting switch SW1 is short-circuited to its VCR terminal VCR. Therefore, the output signal of the VCR tuner 2 is applied to the monitor 9 through the shifting switches SW3, SW2, and SW1.

Furthermore, at this time, the output signal of the VCR tuner 2 through the VCR tuner/line input shifting switch SW3 is processed at the record processing unit 4 and then is applied to the video head VH through the recording/playback shifting switch SW4 and rotary transformer, and then is recorded.

At this time, when the channel up/down key signal is input to the microcomputer 6, the TV tuner 1 is turned on upon the control of the microcomputer 6 to change the channel and simultaneously, the TV/VCR shifting switch SW1 is short-circuited to the TV terminal TV. Therefore, the output signal of the TV tuner 1 is applied to the monitor 9 through the TV/VCR shifting switch SW1 and in this state, the output signal of the VCR tuner 2 is applied to the record processing unit 4 through the VCR tuner/line input shifting switch SW3 and is processed and applied to the video head VH through the recording/playback shifting switch SW4 and rotary transformer RT, and then is recorded. That is, at this time, the two-program recording is carried out in which the output signal of the VCR tuner 2 is processed at the record processing unit 4 and then is applied to the video head VH and is recorded. At the same time, the output signal of the TV tuner 1 selected by the other channel is displayed on the monitor 9.

When the TV/VCR key signal is input again to the microcomputer 6, the low potential VCR control signal is output through the terminal P4 of the microcomputer 6 and the TV/VCR shifting switch SW1 is short-circuited to its VCR terminal VCR. Therefore, the output signal of the VCR tuner 2 is applied to the monitor 9 as in the above description. And when the TV/VCR key signal is input again without channel changing, the TV tuner 1 is turned on upon the control of the microcomputer 6. The TV/VCR shifting switch SW1 is short-circuited to its terminal TV and the output signal of the TV tuner 1 is applied to the monitor 9.

When the stop key signal is input to the microcomputer 6 in such a recording mode state, the recording mode is stopped and then is returned to the initial state that the power is supplied.

As shown in FIG. 3(C), when a high potential tuner control signal is output through the terminal P2 of the microcomputer 6 and a state is entered wherein the playback mode and recording mode. That is, routine PR5 is entered so that a high potential recording/playback control signal is output to the terminal P3. The output signal of the TV tuner 1 is applied to the monitor 9 through the TV/VCR shifting switch SW1. At this time, when the TV/VCR key signal is input to the microcomputer 6, a low potential VCR control signal is output through the terminal P4 of the microcomputer 6 to short-circuit and the TV/VCR shifting switch SW1 to its terminal VCR. Therefore, the output signal of the VCR tuner 2 is applied to the monitor 9 through the shifting switches SW3, SW2, and SW1. When the TV/VCR key signal is input again to the microcomputer 6 in this state, the TV tuner 1 is turned on upon the control of the microcomputer 6 and simultaneously, the TV/VCR shifting switch SW1 is short-circuited to its terminal TV and then the output signal of the TV tuner 1 is applied to the monitor 9.

When the TV/VCR key signal is not input to the microcomputer 6 and other function key signal is input, the other key condition is processed.

Accordingly, the TV/VCR combination having two tuners of the present invention enables the two-program recording function by simple operation of a key and enables the independent and separate monitoring by the switching of the TV and VCR, and therefore, is capable of providing various functions to the user.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A signal switching method of a TV/VCR combination having two tuners which comprises the steps of:
    (a) scanning the state of a key input unit by a microcomputer to display on display means the state of the key input unit and to simultaneously control a TV tuner and a VCR tuner by respective tuner control signals generated by the microcomputer in accordance with the state of the key input unit;
    (b) controlling a recording/playback shifting switch with a recording/playback control signal generated by the microcomputer, to selectively couple a video head through a rotary transformer to one of a record processing unit and a playback processing unit;
    (c) controlling a VCR tuner/line input shifting switch with a VCR tuner/line input control signal generated by the microcomputer to select one of output signals of the VCR tuner and the line input and to apply the selected output signals to the record processing unit;

(d) controlling a VCR-line/playback shifting switch with a VCR-line/playback control signal generated by the microcomputer to select one of output signals of the VCR tuner/line input shifting switch and the playback processing unit; and (e) controlling a TV/VCR shifting switch with a TV/VCR control signal generated by the microcomputer to select one of output signals of the TV tuner and the VCR-line/playback shifting switch and to apply the selected output signals of the TV/VCR shifting switch to a monitor.

2. The signal switching method of claim 1, wherein a TV mode is selected at an initial state when power is applied and the output signal of the TV tuner applied to the monitor and thereafter, when a TV/VCR key signal is input to the microcomputer, the output signal of the line input is applied to the monitor and when the TV/VCR key signal is input again to the microcomputer, the TV mode is selected again and the output signal of the TV tuner is applied to the monitor.

3. The signal switching method of claim 1, wherein when a recording mode is selected by the microcomputer and the output signal of the input is selected by the microcomputer, the output signal of the line input is applied to the video head through the record processing unit and is recorded, and at the same time, the output signal of the line input is applied to the monitor, and thereafter, when a TV/VCR key signal is input to the microcomputer, the recording mode is maintained and at the same time the output signal of the TV tuner is applied to the monitor, and thereafter, when a stop key signal is input to the microcomputer, the record mode is stopped and an initial setting mode when power is initially supplied is selected.

4. The signal switching method of claim 1, wherein ia playback signal of the video head is applied to the monitor through the playback processing unit when a playback mode is selected by the microcomputer and when a TV/VCR key signals is input to the microcomputer, the output signal of the TV tuner is applied to the monitor, and thereafter, when a stop key signal is input to the microcomputer, the playback mode is stopped and an initial setting mode when power is initially supplied is selected.

5. The signal switching method of claim 1, wherein a recording mode is selected by the microcomputer when the output signal of the VCR tuner is selected by the microcomputer, the output signal of the VCR tuner is applied to the video head through the record processing unit and is recorded and simultaneously, the output signal of the VCR tuner is applied to the monitor, and when a channel up/down key signal is input to the microcomputer, a channel of the TV tuner is changed and then the output signal of the TV tuner is applied to the monitor and simultaneously, the recording mode is maintained, and thereafter, when a VCR/TV key signal is input to the microcomputer, the output signal of the VCR tuner is applied again to the monitor, and when a stop key signal is input to the microcomputer, the recording mode is stopped and an initial setting mode when power is initially supplied is selected.

6. The signal switching method of claim 1, wherein when a TV/VCR key signal is input to the microcomputer when a recording mode and playback mode are not selected by the microcomputer, the TV/VCR key signal is input to the microcomputer, the output signal of the VCR tuner is applied to the monitor, and when the TV/VCR key signal is input again to the microcomputer, the output signal of the TV tuner is applied to the monitor.

7. A television/VCR apparatus, having a television tuner and a VCR tuner, comprising:

key input means for generating command signals indicative of user selected operation instructions;

display means for displaying information indicative of the user selected operation instructions;

control means, coupled to said key input means and said display means, for scanning the state of said key input means to control said display means and to generate control signals in accordance with the command signals;

first switch means, coupled to said control means, for selectively coupling a video head of the television/VCR apparatus through a rotary transformer to one of record processing means and playback processing means in accordance with a recording/playback control signal generated by said control means;

second switch means, coupled to the VCR, a line input, and said control means, for selectively outputting one of output signals of the VCR tuner and the line input to said record processing means in accordance with a VCR tuner/line control signal generated by said control means;

third switch means, coupled to said second switch means, said playback processing means and said control means, for selectively outputting one of output signals of said second switch means and said playback processing means in accordance with a VCR-line/playback control signal generated by said control means; and fourth switch means, coupled to said television tuner, said third switch means and said control means, for selectively outputting one of output signals of said television tuner and said third switch means to monitor means in accordance with a television/VCR control signal generated by said control means.

* * * * *